(12) United States Patent
Liu et al.

(10) Patent No.: US 12,330,988 B2
(45) Date of Patent: Jun. 17, 2025

(54) COMPOSITION AND METHOD FOR THE DEWATERING OF AQUEOUS SUSPENSIONS

(71) Applicant: SOLENIS TECHNOLOGIES, L.P., Wilmington, DE (US)

(72) Inventors: Zhaoqing Liu, New York, NY (US); Susete T. Breviglieri, Paulinia (BR)

(73) Assignee: Solenis Technologies, L.P., Wilmington, DE (US)

( * ) Notice: Subject to any disclaimer, the term of this patent is extended or adjusted under 35 U.S.C. 154(b) by 756 days.

(21) Appl. No.: 17/316,951

(22) Filed: May 11, 2021

(65) Prior Publication Data

US 2021/0347691 A1    Nov. 11, 2021

Related U.S. Application Data

(60) Provisional application No. 63/022,602, filed on May 11, 2020.

(51) Int. Cl.
*C04B 2/00* (2006.01)
*C04B 24/16* (2006.01)
*C04B 24/32* (2006.01)

(52) U.S. Cl.
CPC .............. *C04B 2/005* (2013.01); *C04B 24/16* (2013.01); *C04B 24/32* (2013.01)

(58) Field of Classification Search
CPC ........... D21C 9/18; C04B 2/005; C04B 24/16; C04B 24/32; C04B 2/06; C04B 2103/402; Y02P 40/40
See application file for complete search history.

(56) References Cited

U.S. PATENT DOCUMENTS

| | | | |
|---|---|---|---|
| 2,979,528 | A | 4/1961 | Lundsted et al. |
| 4,442,010 | A | 4/1984 | Mehaffey |
| 4,985,162 | A | 1/1991 | Cole |
| 5,209,865 | A | 5/1993 | Winterton et al. |
| 6,123,855 | A | 9/2000 | Hansen et al. |
| 6,312,560 | B1 | 11/2001 | Croft |
| 6,706,144 | B1 | 3/2004 | Furman, Jr. et al. |
| 8,585,992 | B2 | 11/2013 | Wang et al. |
| 9,598,819 | B2 | 3/2017 | Barton |

(Continued)

FOREIGN PATENT DOCUMENTS

| | | |
|---|---|---|
| CN | 105143116 B | 8/2016 |
| JP | 2010-058072 A | 3/2010 |

(Continued)

OTHER PUBLICATIONS

Nakashima et al., "Aggregation of water soluble block copolymers in aqueous solutions: Recent trends", Advances in Colloids and Interface Science, vol. 123-126, Jul. 21, 2006, p. 75-96.

(Continued)

*Primary Examiner* — Abbas Rashid
*Assistant Examiner* — Elisa H Vera
(74) *Attorney, Agent, or Firm* — Lorenz & Kopf LLP

(57) ABSTRACT

Compositions and methods are provided for the recovery of minerals from mineral suspension, such as lime generated in Kraft pulping processes. More particularly, the composition comprises polyalkoxylate co-polymers, alkyleneamine alkoxylates, and optionally anionic surfactants, that when added to mineral dewatering process, aids in the recovery of the mineral.

18 Claims, 3 Drawing Sheets

Experimental Lime Mud Dewatering Equipment

(56) References Cited

U.S. PATENT DOCUMENTS

| | | | |
|---|---|---|---|
| 9,896,366 | B2 | 2/2018 | Urbani |
| 10,457,584 | B2 | 10/2019 | Urbani |
| 2006/0135377 | A1 | 6/2006 | Li et al. |
| 2012/0291815 | A1 | 11/2012 | Monsrud et al. |
| 2017/0044467 | A1* | 2/2017 | Monsrud ............... B08B 3/08 |

FOREIGN PATENT DOCUMENTS

| | | | |
|---|---|---|---|
| JP | 6092265 | B2 | 2/2017 |
| WO | 200107712 | A1 | 2/2001 |
| WO | 2012154331 | A2 | 11/2012 |
| WO | 2014175035 | A1 | 10/2014 |

OTHER PUBLICATIONS

Arraneta et al., "Phase Behaviour of Reverse Poloxamers and Poloxamines in Water", Langmuir, vol. 29, Dec. 20, 2012, p. 1045-1053.

ISA/US, International Search Report and Written Opinion issued in Int. Appl. No. PCT/US2021/031687 mailed Aug. 17, 2021.

L. Besra et al. (1998) Flocculant and Surfactant Aided Dewatering of Fine Particle Suspensions: A Review, Mineral Processing and Extractive Metallurgy Review, 18:1, 67-103, DOI: 10.1080/08827509808914153.

* cited by examiner

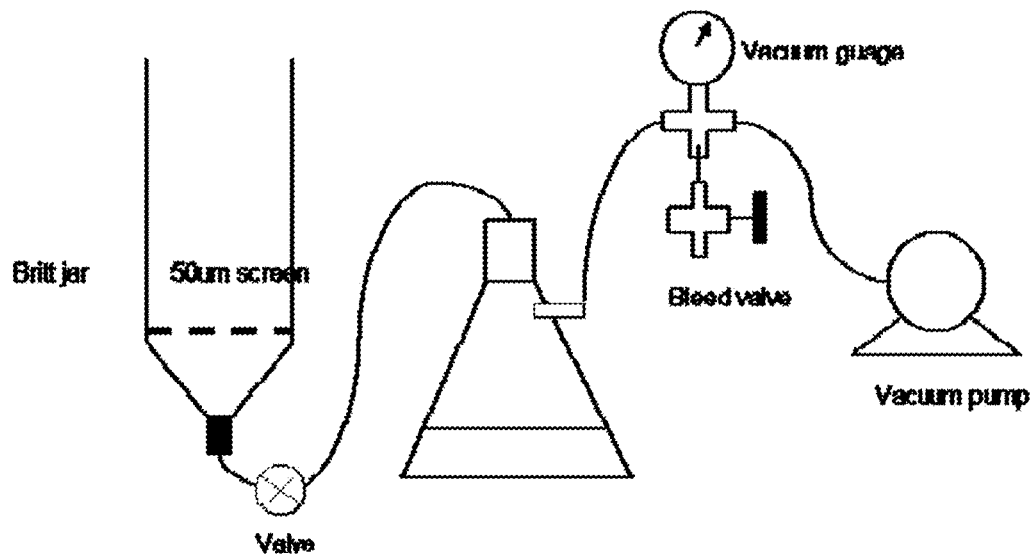
Figure 1- Experimental Lime Mud Dewatering Equipment
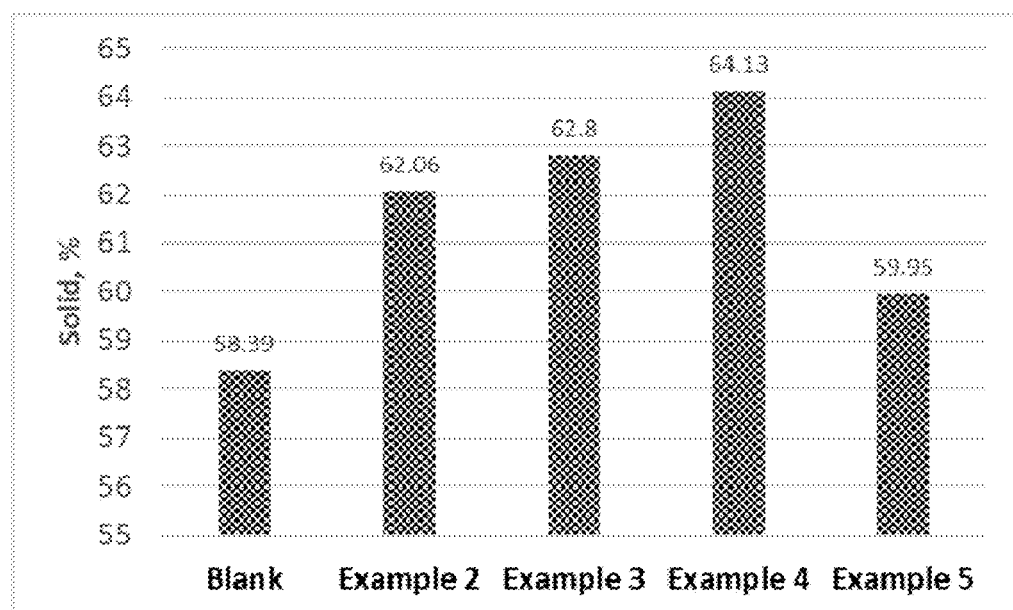
Figure 2. Lime Mud Dewatering

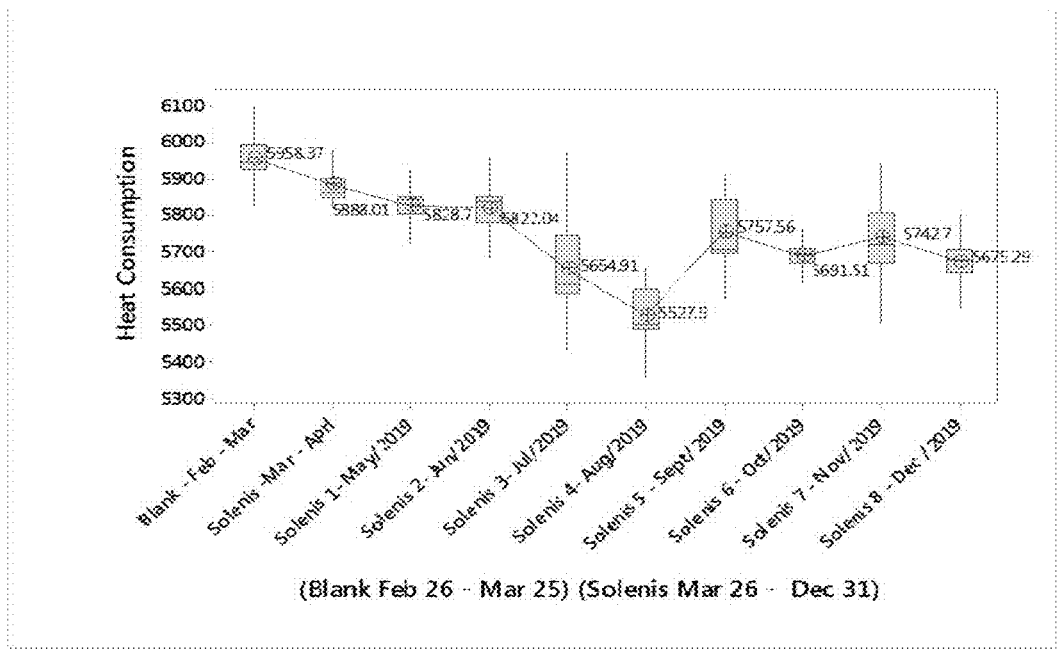
FIG. 3 – Heat Consumption of Factory Ovens
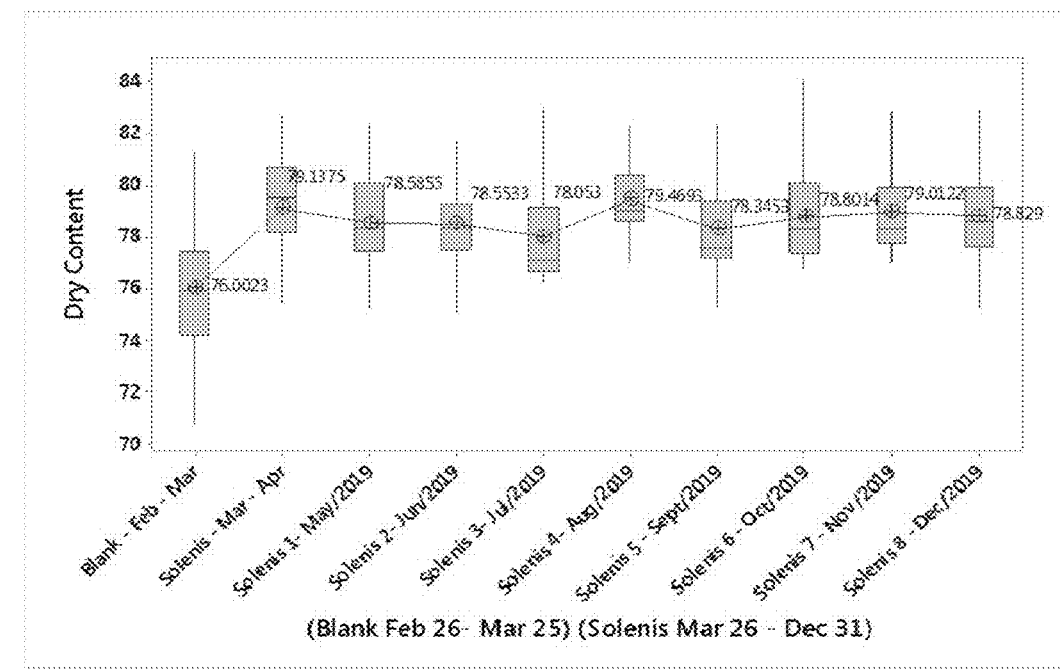
FIG. 4 – Dry Content of Lime Mud

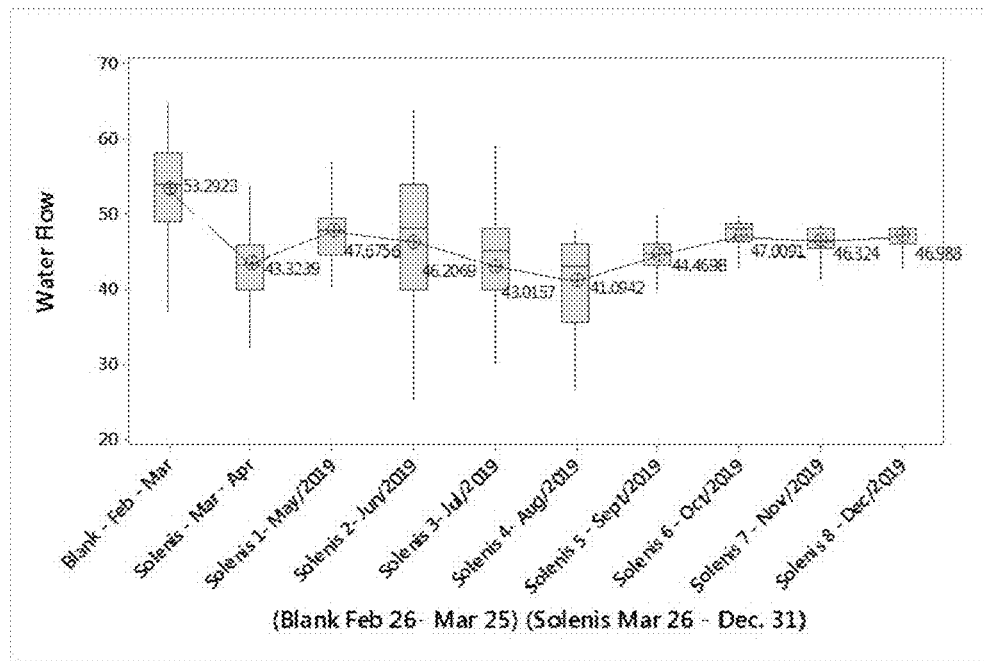
FIG. 5 – Water Flow in the Mud Filter Showers
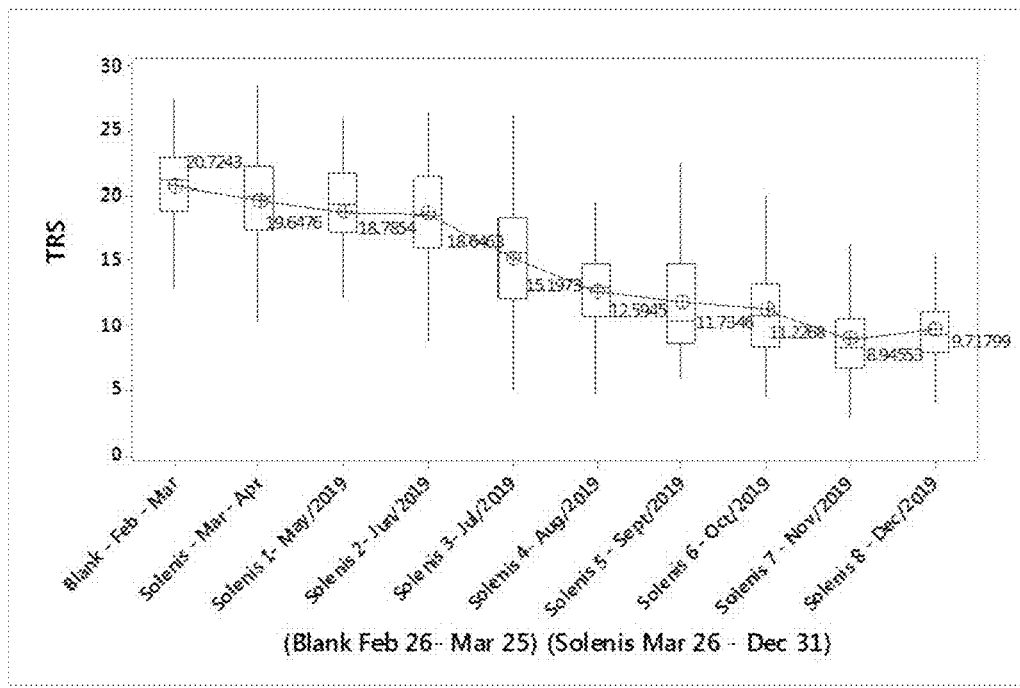
FIG. 6 – Residual Sulfur Content

COMPOSITION AND METHOD FOR THE DEWATERING OF AQUEOUS SUSPENSIONS

CROSS-REFERENCE TO RELATED APPLICATIONS

This application claims the benefit of U.S. Provisional Application Ser. No. 63/022,602, filed May 11, 2020, the disclosures of which is incorporated by reference.

TECHNICAL FIELD

The present disclosure generally relates to mineral recovery from aqueous suspensions containing minerals, such as in lime recovery of the lime generated in Kraft pulping processes. More particularly, the present disclosure relates to methods of recovery of minerals from suspensions and compositions comprising polyalkoxylate co-polymers, alkyleneamine alkoxylates, and anionic surfactants, that when added to mineral suspensions prior to any filtration steps, aids in the recovery of the mineral with less water in it.

BACKGROUND

Mineral recovery is important function where minerals are found in aqueous suspensions, for example, Kraft pulping suspensions. Compositions are added at various points in a Kraft pulping process to aid in the recovery of the lime associated with the Kraft pulping process. The Kraft pulping process involves the digesting of wood chips at elevated temperature and pressure in "white liquor", which is an aqueous solution of sodium sulfide and sodium hydroxide. The white liquor chemically dissolves the lignin that binds the cellulose fibers together at an elevated temperature. There are two types of digester systems, batch and continuous. Most kraft pulping is done in batch digesters. In a batch digester, when cooking is complete, the contents of the digester are transferred to an atmospheric tank usually referred to as a blow tank. The entire contents of the blow tank are sent to pulp washers, where the spent cooking liquor is separated from the pulp. The pulp then proceeds through various stages of washing, and possibly bleaching, after which it is pressed and dried into the finished product. The "blow" of the digester does not apply to continuous digester systems.

The balance of the kraft process is designed to recover the cooking chemicals. Spent cooking liquor and the pulp wash water are combined to form a weak black liquor which is concentrated in a multiple-effect evaporator system to about 55 percent solids. The black liquor is then further concentrated to about 65 percent solids in a direct-contact evaporator, by bringing the liquor into contact with the flue gases from a recovery furnace, or in an indirect-contact concentrator. The strong black liquor is then fired in a recovery furnace. Combustion of the organics dissolved in the black liquor provides heat for generating process steam and for converting sodium sulfate to sodium sulfide. Inorganic chemicals present in the black liquor collect as a molten smelt at the bottom of the furnace.

The smelt is dissolved in water to form green liquor, which is transferred to a causticizing tank where quicklime (calcium oxide) is added to convert the solution back to white liquor for return to the digester system, A lime mud precipitates from the causticizing tank, after which it is calcined in a lime kiln to regenerate quicklime. The quicklime is then re-used to convert green liquor to white liquid.

The heat generated from combustion of black liquor is used for process heating, driving equipment, providing electric power, etc. . . . . . However, many mills need more steam than can be provided by the recovery furnace alone. Thus, conventional industrial boilers that burn coal, oil, natural gas, or bark and wood are commonly used.

An important step in the processing of lime mud is the lime separation from the water. This is typically done using a suitable filtration means such as a rotary vacuum drum filter. Typically, this type of filter is used for dewatering lime mud and washing it just prior to its entrance into a lime kiln. The drum is covered with a screen made of stainless steel or plastic fiber (typically 150 mesh) and a cake of lime mud builds up on the screen as the drum turns. A doctor blade is fixed at a fixed distance from the screen. Consequently, an amount of lime mud is removed by the doctor blade leaving a layer of lime mud on the screen, which acts as a filter medium for the lime mud, During the filtration, as the lime mud builds up and the doctor blade removes it; the dewatered lime mud falls onto a screw feeder which transports it to a feed end of the lime kiln. Dewatered lime mud is typically about 65-75 percent solids, which requires temperatures at the "pre-coat" filter of at least about 50° C. and more generally about 70° C. Cooler temperatures than these can reduce filter capacity by 10 percent or more. Therefore, it is important that any dewatering aids be stable or do not undergo phase separation at temperatures above 50° C.

In the Kraft pulping process, lime is recovered from its slurry and separated by the process described above and the lime cake is then used as smelt for re-caustic processes. The % dry solids of the lime sludge that is generated and processed through a filter for washing varies from mill to mill. Low performance of the filters in the process can generate serious operational problems of the lime kiln, such as, an increase in the amount of gas used for the lime kilns; an increase in the amount of oven heat consumption; a decrease in dry solids from the oven-fed mud; increases in the water consumption of showers with a mud filter; increases in furnace emissions of TRS compounds; an increase of cleaning needed to be performed on the mud filter showers.

One negative impact of a clogged filter is the higher fuel consumption in the furnace due to a lower percent of dry mud entering the furnace, which results in a greater energy needed in evaporating the water. This is followed by the formation of rings inside the furnace due to the drag of soda and an increase of TRS gases through the chimney of the oven. These problems must be solved by the plants with the amount or required fuel consumption being the priority.

Employing the compositions and methods described below results in reduced fuel consumption, wherein the present composition promotes an increase in the removal of water, providing a drier sludge for the oven, which translates into reducing the need for higher heat and a reduction in the consumption of fuel (gas).

In addition, the lime kiln is one of the places in mineral dewatering and recovery processes, where the majority of TRS is emitted due to the presence of sodium sulfide ($Na_2S$) in the mud. With the increase in drainage, there is a greater removal of water and consequently, removal of sodium sulfide, resulting in a reduction in TRS being emitted.

In addition, the present method provides for an increase in drainage of the lime mud or sludge, which translates into the mud being washed better and faster, thus reducing the presence of sodium compounds and preventing the formation of stones and rings and the recovery of these compounds from the process.

Finally, the compositions and methods provide for increased stability of the disclosed suspensions to adopt to the harsh environment of pulp mills, wherein the temperature varies from sub-zero to 50° C.

There is a continuing need to reduce the cost and/or environmental impact of the treatment chemicals used in pulping processes and to obtain maximum benefits and efforts to reduce the water content in the lime cake resulting from the processes described above, which will ultimately save energy in the burning or kiln process as described above. Accordingly, it is desirable to find new and improved methods and formulations that fit within technological advances and ever-changing economical guidelines.

Furthermore, other desirable features and characteristics of the present disclosure will become apparent from the subsequent detailed description and the appended claims, taken in conjunction with the accompanying drawings and this background.

BRIEF SUMMARY

A composition is provided for to enhance dewatering of mineral suspensions. In particular, the composition comprises one or more polyoxyethylene-polyoxypropylene co-polymers, one or more akleneamine alkoxylates and optionally, one or more anionic surfactants. The composition can be added to a lime mud separation process prior to filtration of the lime.

Also, provided for is a method for improved dewatering of aqueous suspensions containing minerals, wherein a composition comprising one or more polyalkoxylate co-polymers and one or more alkyleneamine alkoxylates, is added to the aqueous suspension prior to any filtration step and dewatering the aqueous suspension.

Finally, a method is provided for dewatering a lime mud suspension in a Kraft pulping process. A stable composition comprising one or more polyalkoxylate co-polymers and one or more alk alkoxylates is added to the lime mud of the Kraft pulping process prior to any filtration step; and dewatering the lime mud. A stable composition is a formulation that does not undergo phase at temperatures of about 50° C. or above when water is present.

BRIEF DESCRIPTION OF THE DRAWINGS

The present disclosure will hereinafter be described in conjunction with the following drawing figures, wherein like numerals denote like elements, and wherein:

FIG. 1, illustrates the equipment used in drainage performance testing;

FIG. 2, is a graph of drainage performance testing;

FIG. 3, is a plot showing the heal consumption of a factory oven over time;

FIG. 4, is a plot showing the dry or moisture content of recovered lime mud in a mill over time;

FIG. 5, is a plot showing the water flow in mud filter showers in a mill over time; and FIG. 6, is a plot showing the residual sulfur content in a mill over time.

DETAILED DESCRIPTION

The following detailed description is merely exemplary in nature and is not intended to limit the present disclosure or the application and uses thereof. Furthermore, there is no intention to be bound by any theory presented in the preceding background or the following detailed description.

In one aspect, there is provided a composition for dewatering an aqueous suspension of minerals and water. The composition improves the dewatering of the aqueous suspension having mineral precipitates, such as in dewatering alumina trihydrate, lime mud and cellulose pulp. In particular, the composition comprises one or more polyalkoxylate co-polymers, one or more alkyleneamine alkoxylates, and optionally an anionic surfactant, wherein the composition is added to the aqueous suspension, such as in mineral dewatering that takes place in pulp and paper processes, prior to any dewatering or filtration step of the aqueous suspension.

In another aspect of the composition, the polyalkoxylate co-polymer comprises from about 5% to about 99% by weight actives of the total composition and can be from about 10% to about 95% by weight actives of the total composition, and the one or more alkyleneamine alkoxylates comprises from about 1% to about 95% by weight actives of the total composition and can be from about 5% to about 50% by weight actives of the total composition excluding water. The term "active" or "actives" can be considered the active ingredients of the two- or three-component compositions of the current invention, i.e. co-polymers and alkoxylates. The amounts of these ingredients together are referred to as "active agents" or "actives", which excludes any water in the composition. Therefore, concentrations and amounts of the polymers and anionic surfactants used herein are based on "active solids".

In some aspects of the invention, the alkyleneamine alkoxylates are selected from alkoxylated ethylenediamine, diethylenetriamine, polyethylenepolyamine, propylenediamine, butylenediamine, hexylenediamine and combinations thereof. Examples of acceptable alkyleneamines are those found in WO 01/07712, The amines can be substituted by other alkyl functions other than alkoxylates. The alkoxylates can be polyoxyethylene, polyoxypropylene, polvoxybutylene or their co-polymeric chains, such as commercially available poloxamines, some of which are trade-marked as Tetronics (BASF). Poloxamines are sequential addition product of propylene oxide and ethylene oxide to ethylenediamine, such as those found in U.S. Pat. No. 2,979,528, which is incorporated herein by reference. Other alkoxylated ethylenediamines include Tetronic™ 701, 702, 901, 1101, 1102, 1301, 1302, 1501, and 1502.

The polyalkoxylate co-polymers can be a combination of two or more of polyoxyethylene, polyoxypropylene and polyoxybutylene. The polyalkoxylate can be end-capped with an alkyl group from $C_1$ to $C_{20}$, such as, polyoxyethylene-polyoxypropylene block co-polymers, such as those sold under the trademark "Pluronic" by BASF or other equivalent commercial brands. Polyoxyethylene-polyoxypropylene co-polymers useful in the compositions include Pluronic™ L61, L62, L81, L101 and L121.

In another aspect of the current composition, the composition further comprises one or more anionic surfactants. The anionic surfactants can be from about 0.5% to about 30% by weight actives of the total composition, can be from about 0.5% to about 10% by weight actives of the total composition, can be from about 1% to about 8% by weight actives of the total composition, and may be from about 2% to about 5% weight actives of the total composition. In some aspects of the current composition, the anionic surfactants are selected from fatty acids, such as tall oil fatly acid, oleic acid, alkyl ether carboxylates, sulfonates, sulfates, phosphates, sulfosuccinates and combinations thereof. Preferably, the anionic surfactant is a sulfosuccinate.

In another aspect, the current compositions are stable and do not undergo any phase separation at temperatures above room temperature and can be stable at temperatures of about 50° C. or above when in solution.

In yet another aspect, there is provided methods of dewatering aqueous suspensions that includes mineral particulates and water, such as, lime mud suspensions in Kraft pulping processes. The method includes adding a composition comprising one or more polyoxyethylene-polyoxypropylene copolymers and one or more alkyleneamine alkoxylates, and optionally one or more anionic surfactants, into the aqueous suspension, prior to any dewatering or filtration steps of the aqueous suspension.

In some aspects of the current methods, the composition comprising one or more polyoxyethylene-polyoxypropylene co-polymers, one or more alkyleneamine alkoxylates and optionally anionic surfactant can be added to the aqueous suspension in amounts of from about 10 parts-per-million (ppm) to about 10,000 ppm and can be added in amounts of from 200 ppm to 1000 ppm.

In other aspects of the current methods, the one or more alkyleneamine alkoxylates is selected from polyalkoxylated ethylenediamine, diethylenetriamine, polyethylenepolyamine, propylenediamine, butylenediamine, hexylenediamine and combinations thereof. The amines can be substituted by other alkyl functions other than alkoxytlates. The alkoyxylates can be polyoxyethylene, polyoxypropylene, polyoxybutylene or their co-polymeric chains, such as those commercially available known as poloxamines, trademarked as "Tetronics" by BASF or other equivalent commercial brands. Poloxamines are sequential addition product of propylene oxide and ethylene oxide to ethylenediamine. Their preparation can be found in U.S. Pat. No. 2,979,528, which is incorporated herein by reference. Such alkoxylated ethylenediamines include Tetronic™ 701, 702, 901, 1101, 1102, 1301, 1302, 1501, and 1502 respectively.

In some aspects of the current methods, the polyalkoxylate can be selected from a polymer with a combination of two or more of polyoxy ethylene, polyoxypropylene and polyoxybutylene. The polyalkoxylate can be end-capped with an alkyl group from $C_1$ to $C_{20}$. Preferred polyalkoxylates are polyoxyethylene-polyoxypropylene block co-polymers sold under the trademark "Pluronic" by BASF or other equivalent commercial brands. Polyoxyethylene-polyoxypropylene co-polymers useful in the current compositions include Pluronic™ L61, L62, L81, L101 and L121, respectively.

In yet other aspects of the current methods, the composition further comprises one or more anionic surfactants. The anionic surfactants can be selected from fatty acids, such as tall oil fatly acids or fatty acids from animal or vegetable oil origin, alkyl ether carboxylate, sulfonates, sulfates, phosphates, sulfosuccinates, fatly diacids and combinations thereof. In some aspects the anionic surfactant is a sulfosuccinate.

In some aspects of the current method, the anionic surfactants can comprise from about 0.1% to about 30% by weight actives of the total composition and can be from about 0.5% to about 20% by weight actives of the total composition.

Other aspects of the invention, provides for a method of dewatering lime mud suspensions, for example, lime mud suspensions generated from Kraft pulping processes. The method includes adding one or more polyoxyethylene-polyoxypropylene co-polymers, one or more alkyleneamine alkoxylates, and optionally one or more anionic surfactants to the lime mud suspension prior to any dewatering or filtering of the lime mud suspension.

EXAMPLES

Examples 1 to 5

Preparation of Compositions for Lime Mud Dewatering

Compositions of examples 1 to 5 were prepared according to the charges as specified in Table 1. Synperonic™ T701, an alkoxylated ethylene diamine was mixed with Genapol™ PF10 (propylene oxide and ethylene oxide) or Tergitol™ L101, polyalkylene glycol polymer along with a tall oil fatty acid, and an anionic surfactant. Each of the samples were stored at 5° C., 25° C., 32° C. and 50° C. Examples 1 and 3 to 5 were found stable and no phase separation was observed at all temperatures, while Example 2 without glycol solvent showed turbidity and crystallization at 5° C.

TABLE 1

Compositions of Lime Mud Dewatering by Weight Parts

| Example | 1 | 2 | 3 | 4 | 5 |
|---|---|---|---|---|---|
| Synperonic ™ T701 (alkoxylated ethylene diamine) | | 15 | | 70 | 28 |
| Tergitol ™ L101 (polyalkoxylate co-polymer) | | | | 30 | 12 |
| Genapol ™ PF10 (polyalkoxylate co-polymer | 75 | 75 | 75 | | |
| Tall oil fatty acid | 25 | 10 | 20 | | |
| Butyl glycol | | | 5 | | 10 |
| Water | | | | | 50 |

Example 6

Laboratory Lime Mud Dewatering Evaluation

Drainage performance testing, that is dewatering, was accomplished using the equipment as shown in FIG. 1. To simulate the conditions of the lime mud filter, a 2-stage test was used. A sample of 750 grams (g) of lime mud was diluted with water to 25% solids and heated to 85° C., while mixing a stirrer forming a suspension. The suspension was placed in the Britt jar (1), with a working vacuum pump (5) and the valve (2) closed. Once the mixture was in the Britt jar (1), the valve (2) was opened and the time for forming a base coat on the filter pad was determined by weighing the filter pad and mineral deposit. A stainless-steel plate was placed on top of the base coat. A top coat was then formed on the steel plate covering the base coat using 150 g of the 25% suspension. A sample of the top coat is recovered by lifting the stainless-steel plate and the moisture content of the upper sample layer can be determined. The formation time, i.e. time it takes to form a weight of 150 g of the 25% suspension, of the top coat or upper sample layer was measured in a manner similar to the base coat.

The compositions of Examples 2-5 were evaluated for drainage performance using the above described procedure. The dosage was 300 g/ton.

The parameters used as performance indicators for the lime mud dewatering tests were base coat/top coat/washing time and solids content. The shorter time to vacuum break theoretically indicates higher drainage velocity.

Under the test conditions, there was virtually no variation of time between the treatments, so the solids content of the dewatered lime mud was selected as the parameter used to compare the products.

As can be seen in FIG. 2, Example 4 of higher content of polyethoxylated-polypropoxylated ethylenediamine performed the best among the 4 compositions tested. In the presence of tall oil fatty acid, Examples 2 and 3 also performed well. The poor performance exhibited by Example 5, was believed caused by the dilution of the composition and would have performed comparatively with Example #4 if concentration is taken into consideration.

Example 7-9

Aqueous Compositions

Prior work has shown it was advantageous to formulate the product in water without organic solvent and having viscosities of about 10,000 centipoise (cP) or less, for dosing and application. The formulations for Examples 7-9, included the anionic surfactant dioctyl sodium sulfosuccinate (DOSS) in addition to polyethoxylated-polypropoxylated ethylenediamine (Tetronic™701) and poly oxyethylene-co-polyoxypropylene (Pluronic™L61), The chemical make-up of the compositions can be seen in Table 2. The cloudy point was taken by heating the clear composition to the temperature where it turned cloudy. The temperature was more or less the same as by cooling a cloudy composition to the temperature where it turned clear.

TABLE 2

Aqueous Compositions by Weight of Lime Mud Dewatering

| Example | 7 | 8 | 9 |
|---|---|---|---|
| Tetronic ™ 701 (Polyethoxylated-polyproxylated ethylenediamine) | 300 | 250 | 200.4 |
| Pluronic ™ L61[2] (polyoxyethylene-co-polyoxypropylene) | | 50 | 46.3 |
| DOSS in 70% by wt. propylene glycol | 45 | 45 | 39.2 |
| WATER | 655 | 655 | 714.1 |
| Cloudy Point, ° C. | 40 | 39 | 40.5 |
| pH at 22° C. | 5.44 | 7.82 | 7.96 |

Examples 7-9 were found to have a cloudy point up to 40° C., These compositions underwent phase separation at 50° C. but they were recovered at room temperature after stored at such temperature for 6 weeks. The new formulations were found to become slightly hazy andlor slightly viscous at 32° C. but stayed stable without phase separation after being brought to room temperature. No stability issues were observed at 4° C. and at room temperature over a period of 6 weeks, which included 3 cycles of freeze-and-thaw operations The compositions of Examples 7-9 were submitted for lime mud de-watering testing using the same protocol as described in Example 6, Example 2 was included in the sample set as a reference for performance. Formulations that included an ethylenediamine block polymer (i.e. Tetronic™ 701), Example 8 and Example 9, resulted in improved dewatering characteristics than those without it (i.e. Example 7). Example 2 was found to perform better than the rest, but it is 100% active without any dilution. By normalizing the performance regarding active contents (see Table 3), Examples 7-9 performed better, indicating the DOSS boosted performance.

TABLE 3

Lime Mud Dewatering Gained Over Non-treated

| Example | 2 | 7 | 8 | 9 |
|---|---|---|---|---|
| % Solid gain over none-treated | 7.92 | 3.70 | 6.32 | 5.26 |
| Performance normalized by active | 7.9 | 11.2 | 19.1 | 19.2 |

Examples 10 to 18

Aqueous Compositions of High Cloudy Points

Examples 10 to 18 demonstrate compositions comprising polyoxyethylene-co-polyoxypropylene, i.e. Pluronic™ L61, Genapol™ PF10, Synperonic™ L61 and Chemal™ BP-261 from various sources have high enough cloudy point temperatures that they can be used in higher temperature applications. Each of the compositions were formulated at elevated cloudy points. In Examples 11-18, an anionic surfactant, i.e. Dowfax™2A1, an alkyl diphenyl sulfonate (Dow. Inc.) or sodium xylene sulfonate was added with low amounts of glycol solvent as a modifier see Table 4).

TABLE 4

Compositions with high Cloudy Point

| Examples | 10 | 11 | 12 | 13 | 14 | 15 | 16 | 17 | 18 |
|---|---|---|---|---|---|---|---|---|---|
| Pluronic ™ L61 | 20.89 | | 25 | | | 25 | | | 25 |
| Genapol ™ PF10 | | 25 | | 25 | | | | 25 | |
| Synperonic ™ L61 | | | | | 25 | | | | |
| Chemal BP-261 | | | | | | | 25 | | |
| Tetronic ™ 701* | 4.18 | 5 | 5 | 5 | 5 | 5 | 5 | 5 | 5 |
| DOSS, 70% PG | 3.76 | 4.5 | 4.5 | 4.5 | 4.5 | 4.5 | 4.5 | 4.5 | 4.5 |
| WATER REGULAR | 50.14 | 61.61 | 61.92 | 60.94 | 60.94 | 60.89 | 60.94 | 60.44 | 60.62 |
| Dowfax ™ 2A1 | | 2.38 | 2.01 | 2.35 | 2.05 | 2.09 | 2.06 | 2.80 | 2.58 |
| SXS 40% | 21.02 | | | | | | | | |
| Dipropylene glycol | | 2.5 | 2.52 | | | | | | |
| Butyl Carbitol | | | | 2.5 | 2.5 | 2.5 | 2.5 | 2.5 | 2.5 |
| KATHON ™ LX (microbicide) | 0.01 | 0.01 | 0.01 | 0.01 | 0.01 | 0.01 | 0.01 | 0.01 | 0.01 |
| Cloudy Point, ° C. | 52.5 | 41 | >60 | 50 | >50 | >50 | >50 | 50 | >50 |

*Polyethoxylated-polypropoxylated ethylenediamine.

Example 19

Fatty Dicarboxylic Acid Potassium Salt

The following mixture was used in Examples 20 and 21. Potassium hydroxide at 45% 10.03 parts was diluted in 70.92 parts of water. To this solution. $C_{16-18}$ alkenyl succinic anhydride, Prequel™ 20000, 20.17 parts was added slowly and the mixture was heated at 70° C. to 80° C. until the mixture turned clear and homogeneous.

Examples 20 and 21

Lime Mud Dewatering Compositions

Compositions were prepared according to charges shown in Table 5. These compositions have cloudy points above 50° C.

TABLE 5

Fatty Diacid for Lime Mud Dewatering

| Example | 20 | 21 |
|---|---|---|
| PLURONIC ™ L61 | 26.72 | 25 |
| TETRONIC ™ 701 | 5.00 | 5 |
| DOSS 70% in polyethylene glycol 400 | 2.32 | 2.0 |
| Product from Example 19 | 10.14 | 10.0 |
| WATER REGULAR BULK | 60.12 | 655 |
| Cloudy Point, ° C. | 60 | 58 |
| pH at 22° C. | 8.12 | 8.11 |

Example 22

Plant Trial

A mill trail was run over a period of 9-month period during which variables such as fuel consumption, dry lime mud content, water flow in the mud filter showers, and residual sulfur content of the lime mud were monitored. Mill properties are as follows:

Mud filter—Andritz;
Disk filter (14 discs 3.7 dm);
Nominal kiln production: 960 tons;
Fuels: main natural gas and auxiliary methanol During the trial, 170 g of composition from Example 2 was applied per metric ton of produced lime. The composition was added to the process wherein 90% of the composition was added to the lime mud filter shower and 10% of the composition was added to the sludge feed, wherein dilution of the lime product with water takes place. The heat consumption of the factory ovens was based on the gas reduction calculated by calorific value: i.e. reduction MJ/ton caloric value of gas (e.g., 35)×average oven production (e.g., 920 ton)×gas reduction $Nm^3$/day).

Using the above calculation, gas reduction was monitored over the length of the trial and plotted over time (see FIG. 3), For calculation purposes the caloric value of 5.757 MJ/ton was determined to represent the d content of the lime mud.

The average heat consumption at the start of the trial was determined to be 5.958 MJ/ton. The composition was added to the process as described above and over the 9-month trial the heat consumption was reduced to an average of 5,732 MJ/ton. This resulted in a heat consumption reduction of about 226 MJ/ton CaO or about 5,940 $Nm^3$/day, which is significant.

The dry content of the lime mud was also monitored over the length of the trial and shown in FIG. 4. Prior to addition of the inventive formulation, the average dry content of the lime mud was found to be about 76% solids. After addition of the new composition the average dry content of the lime mud was increased to 78.75% solids. In addition, the standard deviation of the dry content of the lime mud prior to addition of the new composition was 2.81, while the standard deviation after addition of the new composition was improved to 1.86 indicating greater stability of the composition.

Another indicator of operational efficiency is the water flow in the lime mud filter showers. The average water flow in the mud filter showers prior to addition of the new composition was 53 $m^3$/h. However, after addition of the new composition, the average water flow in the lime mud filter showers was 45 $m^3$/h. This resulted in a reduction of 15% (196 m3/day) in water consumption when compared with water usage prior to the addition of the new formulation (see FIG. 5). Finally, no obstruction of the lime mud filters occurred during the trial resulting in the reduction of the amount of water needed in the process.

Finally, the residual sulfur content of the lime mud was determined over the length of the trial (see FIG. 6). Prior to addition of the new formulation the average residual sulfur, was 20.72 mg/$Nm^3$. Subsequent to the addition of the new composition, the sulfur content was determined to be 14.06 mg/$Nm^3$. This results in an average reduction of 32% in total residual sulfur (TRS), despite the reduction of water used in the showers.

To summarize, the results of the plant trial have shown that using the composition of the present application that includes polyoxyethylene-polyoxypropylene co-polymers and alkyleneamine alkoxylates can provide a) a reduction in the amount of gas used for the lime kilns (about 5.940 $Nm^3$/day of natural gas); 11) a reduction in the amount of oven heat consumption (about 226 MJ/Ton CaO of oven heat consumption); and a 3.62% increase in dry solids from the oven-fed lime mud.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

We claim:

1. A composition for dewatering an aqueous suspension of minerals and water comprising:
   a) one or more polyoxyethylene-polyoxypropylene co-polymers,
   b) one or more alkyleneamine alkoxylates selected from the group consisting of alkoxylated ethylenediamine, diethylenetriamine, polyethylenepolyamine, propylenediamine, butylenediamine, hexylenediamine, and combinations thereof; and
   c) a lime mud suspension.

2. The composition according to claim 1, wherein the one or more polyoxyethylene-polyoxypropylene co-polymers comprise from about 5% to about 99% by weight actives of the total composition; and the one or more alkyleneamine alkoxylates comprise from about 1% to about 95% by weight actives of the total composition.

3. The composition according to claim 1, wherein the composition further comprises one or more anionic surfactants.

4. The composition according to claim 3, wherein the one or more anionic surfactants are selected from fatty acids, sulfonates, sulfates, phosphates, sulfosuccinates, fatty diacids, and combinations thereof.

5. The composition according to claim 4, wherein the one or more anionic surfactants is sulfosuccinate.

6. The composition according to claim 3, wherein the anionic surfactants comprise from about 0.5% to about 30% by weight actives of the total composition excluding water.

7. The composition according to claim 1, wherein the composition undergoes no phase separation at temperatures of about 50° C. or above when water is present.

8. The composition of claim 1, wherein the lime mud suspension is a mud suspension from a Kraft pulp process.

9. A method of dewatering an aqueous suspension comprising:
providing an aqueous suspension of a lime mud;
adding to the aqueous suspension the composition according to claim 1; and filtering the aqueous suspension.

10. The method according to claim 9, wherein the composition is added in an amount of from about 10 ppm to about 10,000 ppm of the aqueous suspension.

11. The method according to claim 9, wherein the composition further comprises one or more anionic surfactants.

12. The method of claim 11, wherein the one or more anionic surfactants are selected from fatty acids, sulfonates, sulfates, phosphates, sulfosuccinates, fatty diacids and combinations thereof.

13. The method according to claim 12, wherein the one or more anionic surfactants is a sulfosuccinate.

14. The method according to claim 11, wherein the one or more anionic surfactants comprise from about 0.5% to about 30% by weight actives of the total composition.

15. A method for dewatering a lime mud suspension comprising:
providing a lime mud suspension;
adding to the lime mud suspension a composition comprising a) one or more polyoxyethylene-polyoxypropylene co-polymers, and b) one or more alkyleneamine alkoxylates selected from the group consisting of alkoxylated ethylenediamine, diethylenetriamine, polyethylenepolyamine, propylenediamine, butylenediamine, hexylenediamine, and combinations thereof;
wherein the one or more polyoxyethylene-polyoxypropylene co-polymers comprise from about 5% to about 99% by weight actives of the total composition and the one or more alkyleneamine alkoxylates comprise from about 1% to about 95% by weight actives of the total composition; and
dewatering the lime mud suspension.

16. The method according to claim 15, wherein the one or more polyoxyethylene-polyoxypropylene co-polymers comprise from about 20% to about 50% by weight actives of the total composition, and the one or more alkyleneamine alkoxylates comprise from about 5% to about 50% by weight actives of the total composition.

17. The method according to claim 15, wherein the composition further comprises one or more anionic surfactants.

18. The method according to claim 15, wherein the lime mud suspension is from a Kraft pulping process.

* * * * *